(12) United States Patent
Shingai

(10) Patent No.: US 8,351,737 B2
(45) Date of Patent: Jan. 8, 2013

(54) IMAGE PROCESSING APPARATUS

(75) Inventor: Kosuke Shingai, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 293 days.

(21) Appl. No.: 12/615,982

(22) Filed: Nov. 10, 2009

(65) Prior Publication Data

US 2010/0119174 A1    May 13, 2010

(30) Foreign Application Priority Data

Nov. 11, 2008  (JP) ................................. 2008-289094

(51) Int. Cl.
  *G06K 9/40*  (2006.01)
(52) U.S. Cl. ....................... 382/275; 382/254
(58) Field of Classification Search .................. 382/254, 382/275

See application file for complete search history.

(56) References Cited

U.S. PATENT DOCUMENTS

| | | | |
|---|---|---|---|
| 6,738,527 B2 | 5/2004 | Kuwata et al. | |
| 7,298,412 B2 | 11/2007 | Sannoh et al. | |
| 7,358,994 B2 | 4/2008 | Yano | |
| 7,519,828 B2 * | 4/2009 | Kittler et al. | 713/186 |
| 8,064,712 B2 * | 11/2011 | Wheeler et al. | 382/254 |
| 2004/0213437 A1 * | 10/2004 | Howard et al. | 382/115 |
| 2009/0135269 A1 | 5/2009 | Nozaki et al. | |
| 2010/0046842 A1 * | 2/2010 | Conwell | 382/218 |
| 2010/0048242 A1 * | 2/2010 | Rhoads et al. | 455/556.1 |

FOREIGN PATENT DOCUMENTS

| | | |
|---|---|---|
| JP | 11-136514 A | 5/1999 |
| JP | 2000-067218 A | 3/2000 |
| JP | 2003-092726 A | 3/2003 |
| JP | 2004-062651 A | 2/2004 |
| JP | 2005-159387 A | 6/2005 |
| JP | 2006-042035 A | 2/2006 |
| JP | 2007-020029 A | 1/2007 |
| JP | 2007-148691 A | 6/2007 |
| JP | 2008-193386 A | 8/2008 |
| JP | 2008-244997 A | 10/2008 |

\* cited by examiner

*Primary Examiner* — Stephen R Koziol
(74) *Attorney, Agent, or Firm* — Kilpatrick Townsend & Stockton LLP

(57) ABSTRACT

Provided is an image processing apparatus for performing a correction process with respect to object image data, the image processing apparatus including: a first determining unit that determines whether facial image data including a face of a person, which is extracted from the object image data, is attached to relevant object image data; a second determining unit that determines whether reduction image data of the object image data is attached to the relevant object image data; a selecting unit that selects the facial image data or the reduction image data as selection image data; a correction parameter setting unit that extracts a feature amount from the selection image data and sets a correction parameter for image correction based on the feature amount; and a correction processing unit that corrects the object image data based on the correction parameter.

12 Claims, 7 Drawing Sheets

IMAGE PROCESSING APPARATUS

This application claims priority to Japanese Patent Application No. 2008-289094, filed Nov. 11, 2008, the entirety of which is incorporated by reference herein.

BACKGROUND

1. Technical Field

The present invention relates to an image processing apparatus.

2. Related Art

In the case of processing image data obtained by digitalizing an image, a correction process is generally performed with respect to the image data. In this regard, there has been proposed a method for performing the correction process more accurately. For example, JP-A-11-136514 discloses an image processing apparatus that obtains plural feature amounts from the image data based on evaluation criteria, and performs correction using a correction parameter set based on the feature amounts.

However, a significant amount of time is required to set the correction parameter from the entire image data as described above.

SUMMARY

An advantage of some aspects of the invention is to set a correction parameter in a short time as compared with the case of setting the correction parameter from the entire object image data.

According to an aspect of the invention, there is provided a first image processing apparatus for performing a correction process with respect to object image data, including: a selecting unit that determines whether facial image data including a face of a person, which is extracted from the object image data, is attached to relevant object image data, and selects the facial image data as selection image data if the facial image data is attached to the relevant object image data; a correction parameter setting unit that extracts a feature amount from the selection image data and sets a correction parameter for image correction based on the feature amount; and a correction processing unit that corrects the object image data based on the correction parameter.

According to the first image processing apparatus of the invention, the correction process is performed with respect to the object image data, and it is determined whether the facial image data including the face of the person, which is extracted from the object image data, is attached to the relevant object image data. When the facial image data is attached to the object image data, the facial image data is selected as the selection image data. Further, after the feature amount is extracted from the selection image data, the correction parameter for image correction is set based on the feature amount and the object image data is corrected based on the correction parameter. Consequently, the correction parameter can be set from the facial image data, and the setting of the correction parameter can be performed in a short time as compared with the case of setting the correction parameter from the entire object image data.

According to the first image processing apparatus of the invention, the selecting unit may determine whether the reduction image data of the object image data is attached to the relevant object image data when the facial image data is not attached to the object image data, and may select the reduction image data as the selection image data when the facial image data is attached to the relevant object image data. Consequently, although the facial image data is not attached thereto, the correction parameter can be extracted from the reduction image data, and the setting of the correction parameter can be performed in a short time as compared with the case of setting the correction parameter from the entire object image data.

According to the first image processing apparatus of the invention, when the facial image data is attached to the object image data, the selecting unit may determine whether the ratio of the size of relevant facial image data with respect to the size of the relevant object image data is equal to or larger than the predetermined first ratio, and may select the relevant facial image data as the selection image data only when the ratio is equal to or larger than the first ratio. Consequently, the correction parameter can be extracted from the facial image data including the face of the person which is not the subject in the object image data, and the correction can be prevented from being inaccurately performed with respect to the entire object image data.

According to the first image processing apparatus of the invention, the selecting unit may determine whether the ratio of the size of the relevant facial image data with respect to the size of the relevant object image data is equal to or larger than the predetermined second ratio greater than the first ratio when the facial image data of the first ratio or more is attached to the object image data; may select only the relevant facial image data as the selection image data when the ratio is equal to or larger than the second ratio; may determine whether the reduction image data of the object image data is attached to the relevant object image data when the ratio is not equal to or larger than the second ratio; and may select the facial image data of the first ratio or more and the reduction image data as the selection image data when the reduction image data of the object image data is attached to the relevant object image data. Consequently, the case in which the main image data employs only the face of the person as the subject is distinguished from the case in which the main image data employs other objects as the subject as well as the face of a person, so that the correction parameter can be more properly set for each case.

According to the first image processing apparatus of the invention, the selecting unit may determine whether area information, which indicates an area occupied by relevant facial image data in the relevant object image data, is attached to the relevant facial image data when the facial image data is attached to the object image data; may determine whether an area of a predetermined ratio or more specified by the area information is included in a predetermined main area serving as a main area in the object image data when the area information is attached to the relevant facial image data; and may select the relevant facial image data as the selection image data only when the area of the predetermined ratio or more is included in the predetermined main area. Consequently, the correction parameter can be set from the facial image data including the face of the person which is not the subject in the object image data, and the correction can be prevented from being inaccurately performed with respect to the entire object image data. In such a case, the area information may include the position and the size of the facial image data in the object image data.

According to the first image processing apparatus of the invention, the selecting unit may determine whether additional information, which indicates that the object image data is not an image employing a person as a subject, is attached to the relevant object image data; may determine whether the reduction image data of the object image data is attached to the relevant object image data, without determining whether the facial image data is attached to the relevant object image data, when the additional information is attached to the relevant object image data; and may select the reduction image data as the selection image data when the additional information is attached to the relevant object image data. Consequently, the correction parameter can be set from the facial image data even if the object image data is not the image which employs the face of the person as the subject, so that the correction can be prevented from being inaccurately performed with respect to the entire object image data.

According to the first image processing apparatus of the invention, when the facial image data is not attached to the object image data, the selecting unit may determine whether area information, which indicates an area occupied by a face of a person in the relevant object image data, is attached to the relevant object image data, and, when the facial image data is attached to the object image data, the selecting unit may extract an area specified by the area information from the relevant object image data as partial image data, and may regard the partial image data as the facial image data to determine that the relevant facial image data is attached to the relevant object image data. Consequently, the partial image data can be extracted from the area information and regarded as the facial image data. Further, even if the facial image data is not attached thereto, the same process as that performed when the facial image data is attached thereto can be performed.

According to another aspect of the invention, there is provided a second image processing apparatus including: an obtaining unit that obtains object image data; an auxiliary data generation unit that generates auxiliary data from the object image data, and generates at least one of area information, which indicates an area occupied by the face of a person in the object image data, and facial image data obtained by extracting the face of the person from the object image data, as auxiliary data; and a collection data generation unit that generates a collection data including the object image data and the auxiliary data.

According to the second image processing apparatus of the invention, at least one of the area information, which indicates the area occupied by the face of the person in the obtained object image data, and the facial image data obtained by extracting the face of the person from the object image data, is generated as the auxiliary data, and the collection data including the object image data and the auxiliary data is generated. Consequently, when the object image data included in the collection file is to be corrected, a correction parameter can be set using the auxiliary data, and the setting of the correction parameter can be performed in a short time as compared with the case of setting the correction parameter from the entire object image data.

According to the second image processing apparatus of the invention, the auxiliary data generation unit may generate the area information, which indicates the area occupied by the face of the person in the object image data, and the facial image data obtained by extracting the face of the person from the object image data, as the auxiliary data, and the collection file generation unit may generate the collection file by mapping the area information and the facial image data to each face. Consequently, it is possible to determine whether to set the correction parameter from the facial image data by using the corresponding area information.

BRIEF DESCRIPTION OF THE DRAWINGS

The invention will be described with reference to the accompanying drawings, wherein like reference numerals denote like elements.

DESCRIPTION OF EXEMPLARY EMBODIMENTS

Figure 1:
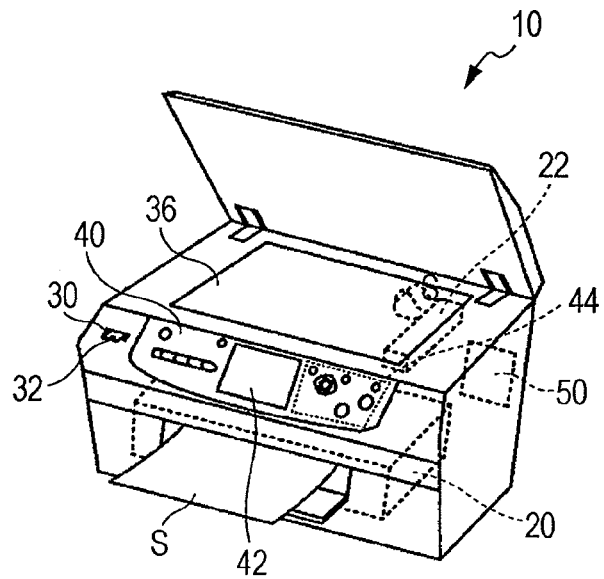
FIG. 1 is a perspective view schematically showing the configuration of a multifunctional apparatus according to an embodiment.
Figure 2:
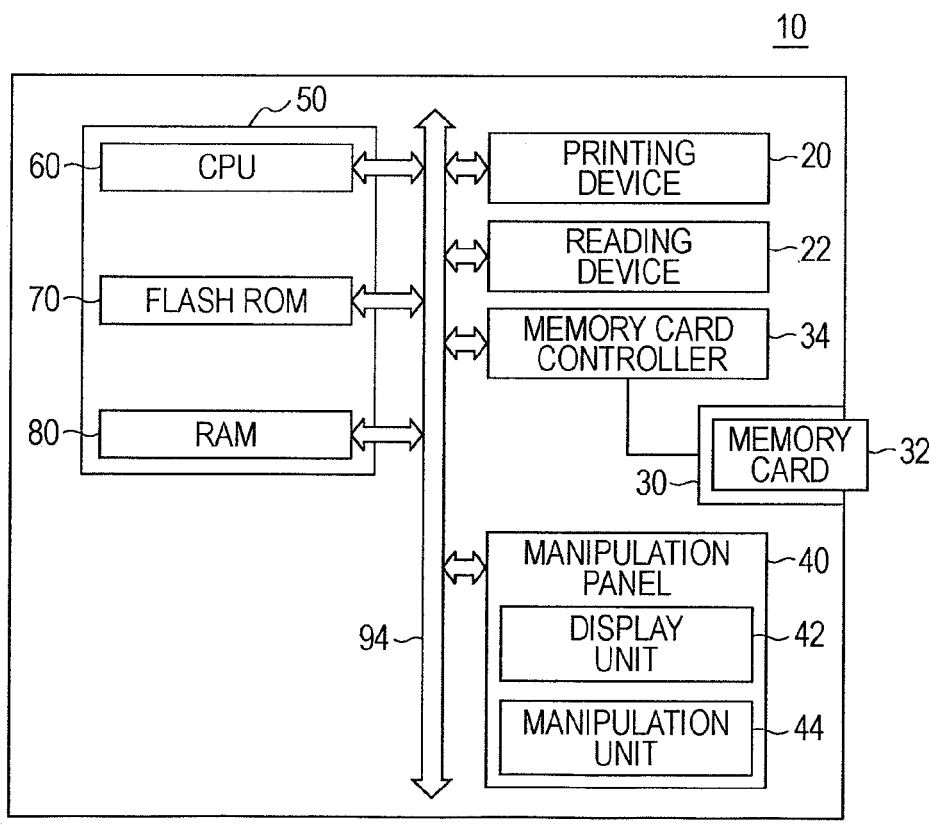
FIG. 2 is a block diagram showing the electrical connection of a multifunctional apparatus.

Hereinafter, an embodiment of the invention will be described with reference to the accompanying drawings. FIG. 1 is a perspective view schematically showing the configuration of a multifunctional apparatus 10 according to the embodiment of the invention, and FIG. 2 is a block diagram showing the electrical connection of the multifunctional apparatus 10.

As shown in FIG. 1, the multifunctional apparatus 10 according to the embodiment includes a printing device 20 for performing printing, a reading device 22 for reading an image, a memory card controller 34 (see FIG. 2) for reading data from a memory card 32 and writing the data in the memory card 32, a manipulation panel 40 for receiving user instructions indicating various pieces of information, and a main controller 50 for controlling the multifunctional apparatus 10. As shown in FIG. 2, according to the multifunctional apparatus 10, the printing device 20, the reading device 22, the memory card controller 34, the manipulation panel 40, and the main controller 50 exchange various control signals and various pieces of data through a bus 94.

If a print instruction is received from the main controller 50, the printing device 20 is configured to serve as a well-known ink jet color printer mechanism that performs printing by ejecting ink on a record sheet S from a printing head based on image data which is subject to the print instruction.

If a reading instruction is received from the main controller 50, the reading device 22 is configured to serve as a well-known full color scanner that reads a document mounted on a glass board 36 as image data. The reading device 22 includes a well-known color image sensor that analyzes reflecting light after being irradiated toward the document into colors of red R, green G and blue B and employs the RGB colors as read data.

The memory card controller 34 is configured to perform data input/output with respect to the memory card 32 inserted into a slot 30 transversely provided in the manipulation panel 40. The memory card 32, for example, is able to store image data encoded using JPEG.

The manipulation panel 40 includes a display unit 42, which serves as a liquid crystal display, and a manipulation unit 44 provided with a copy button, a print button, a scan button, a power button, a numeric keyboard or the like. The manipulation panel 40 displays various pieces of information on the display unit 42 or receives user instructions via manipulation of the manipulation unit 44.

The main controller 50 is configured to serve as a micro processor that employs a CPU 60 as a main element, and includes a flash ROM 70, which is electrically rewritable and maintains data although power is shut down, and a ROM 80 that temporarily stores print data or the like. The CPU 60 receives various operation signals, various detection signals or various pieces of data from the printing device 20 and the reading device 22, or receives manipulation signals generated in response to the manipulation of the manipulation unit 44 of the manipulation panel 40. Further, the CPU 60 outputs an instruction to the printing device 20 such that printing is performed, outputs various control signals to the reading device 22, outputs data to the memory card controller 34 such that the data is stored in the memory card 32, and outputs a control signal to the display unit 42 of the manipulation panel 40. The flash ROM 70 stores various processing programs, various pieces of data, various tables or the like.

Figure 3:
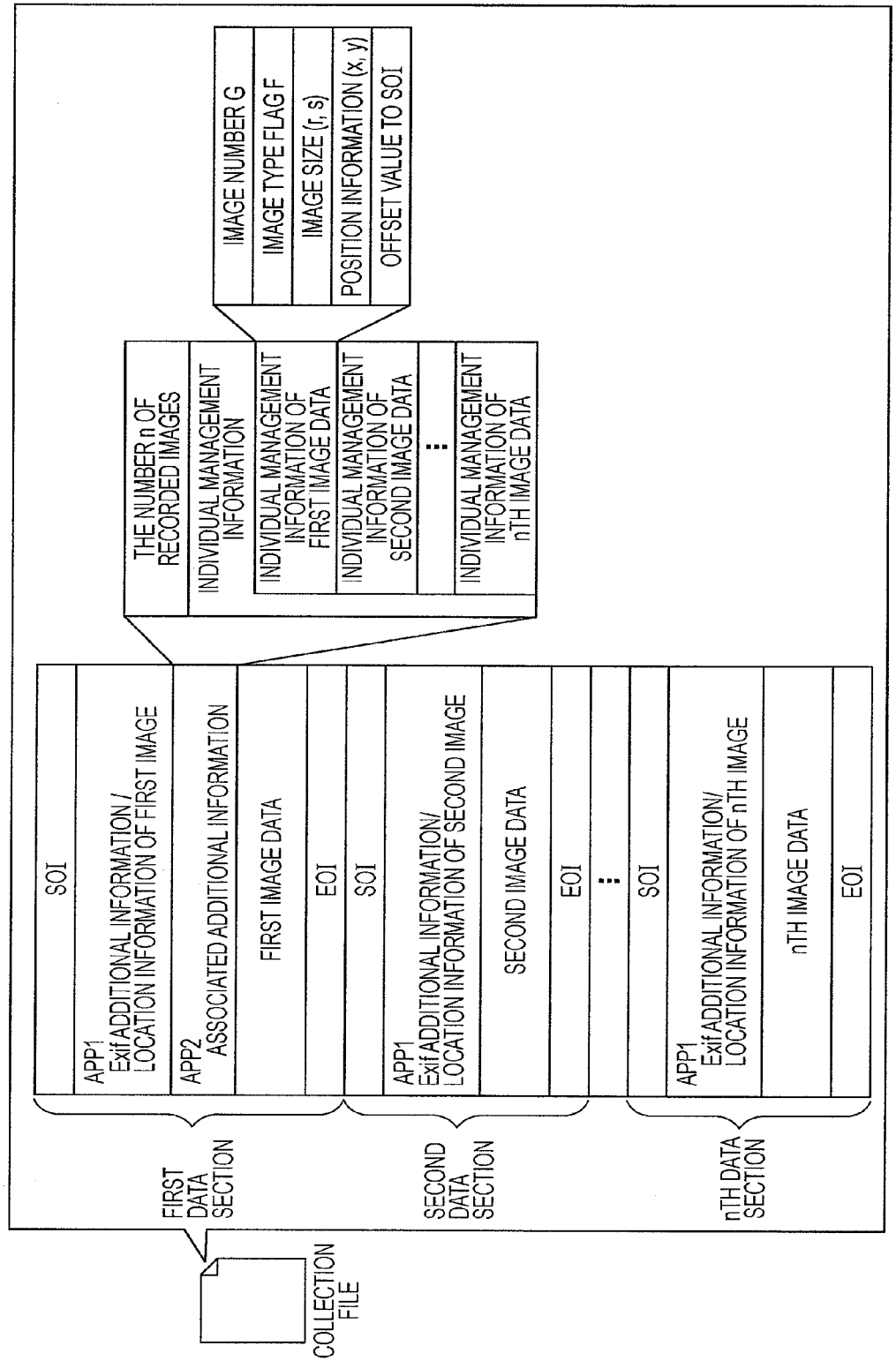
FIG. 3 is a view showing a data structure of a collection file.

The multifunctional apparatus 10 according to the embodiment can deal with a collection file obtained by integrating one piece of main image data, facial image data obtained by extracting a face of a person from the main image data, and reduction image data, which is obtained by reducing the main image data, into one according to a data structure which will be described later. FIG. 3 is a view showing one example of the data structure of the collection file. As shown in FIG. 3, the collection file includes first to $n^{th}$ data sections for storing first to $n^{th}$ image data, which are encoded using a JPEG method. The first to the $n^{th}$ data sections each include an SOI (Start Of Image), which is a mark indicating the start of a data section, a mark segment APP1 for recording Exif additional information related to an image such as location information indicating an object of an image, a photographing data or the like, a mark segment APP2 for recording associated additional information related to association of the data sections, each image data (first image data, second image or the like) encoded using the JPEG method, and an EOI (End Of Image), which is a mark indicating the end of data. Herein, the mark segment APP2 exists only in the first data section, and stores the number n of recorded images indicating the number of images stored in the collection file, and individual management information of the first to the $n^{th}$ data. Each piece of individual management information is obtained by mapping an image number G of each image data, an image type flag F, which has values of 0, 1 and 2 when each image data is the main image data, the facial image data and the reduction image data, an image size (r, s) indicating the size (r pixels in row×s pixels in column) of each image data, position information (x, y) indicating a left upper position of the facial image data, which employs a left upper portion of the main image data as a start point, by using a coordinate (x pixels in row×y pixels in column) when each image data is the facial image data, and an offset value of each image data up to the SOI. The mark segment APP2 stores individual management information of the first to the $n^{th}$ data. That is, the values (e.g., 1, 2, . . . n) of the image number G correspond to the first, second, . . . , $n^{th}$ data, respectively.

Figure 4:
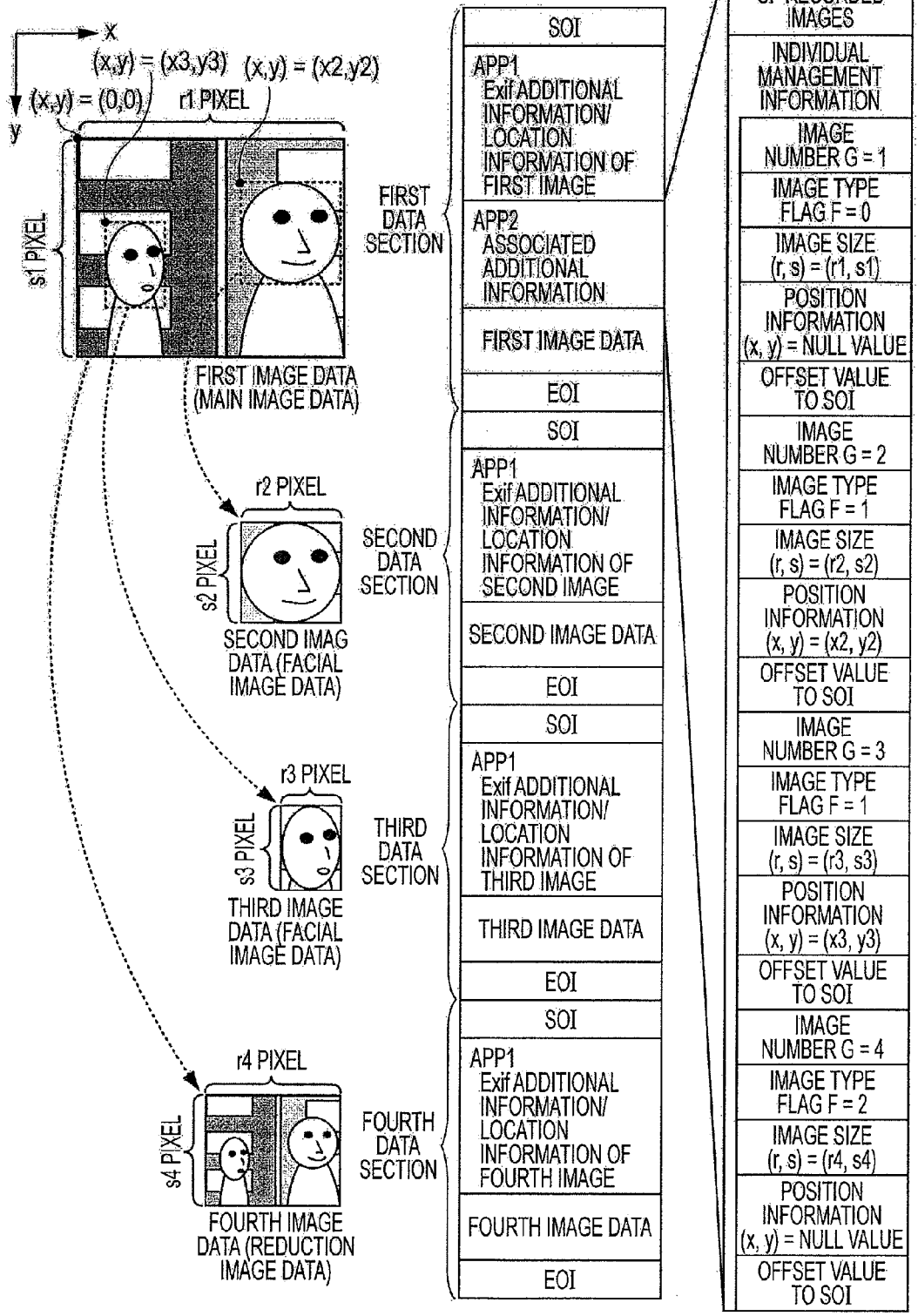
FIG. 4 is a view showing one example of a collection file.

FIG. 4 is a view showing one example of a collection file obtained by integrating main image data, two pieces of facial image data and one piece of reduction image data into one. As shown in FIG. 4, the main image data is stored as the first image data, the facial image data of a person extracted from the main image data is stored as the second and the third image data, and the reduction image data of the main image data is stored as the fourth image data in the collection file. In such a case, since the number of the image data is 4, the value of 4 is stored as the number n of recorded images of the mark segment APP2. Further, in relation to the individual management information, the image number G of 1, the image type flag F of 0, the image size (r, s) of (r1, s1), the position information (x, y) of a NULL value and the offset value of the first image data to the SOI are mapped, the image number G of 2, the image type flag F of 1, the image size (r, s) of (r2, s2), the position information (x, y) of (x2, y2) and the offset value of the second image data to the SOI are mapped, the image number G of 3, the image type flag F of 1, the image size (r, s) of (r3, s3), the position information (x, y) of (x3, y3) and the offset value of the third image data to the SOI are mapped, and the image number G of 4, the image type flag F of 2, the image size (r, s) of (r4, s4), the position information (x, y) of a NULL value and the offset value of the fourth image data to the SOI are mapped. As described above, the position information (x, y) is necessary only to the facial image data, and the position information mapped to other image data, except for the facial image data, has the NULL value. That is, FIG. 4 is for illustrative purposes only, and the first image data is not necessarily the main image data in the collection file. In addition, one piece of facial image data or three pieces or more of facial image data may be provided, and only one of the facial image data and the reduction image data may be stored.

Hereinafter, the following description will be given based on the operation of the multifunctional apparatus 10 having the configuration according to the embodiment, particularly, a printing process when the main image data is printed by the printing device 20 by using the collection file stored in the memory card 32, and a collection file generation process that generates the collection file by employing the image data stored in the memory card 32 as the main image data.

Figure 5:
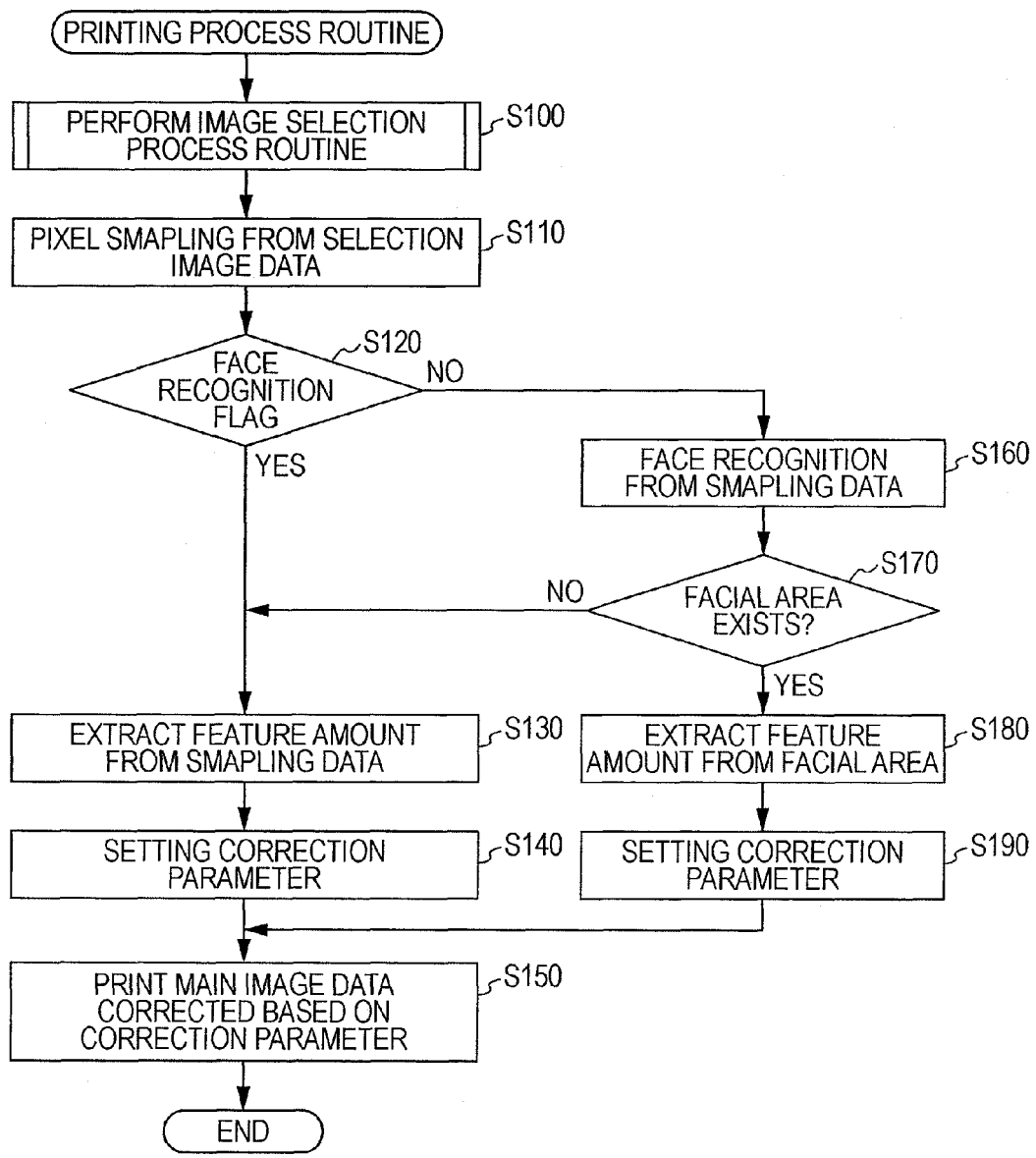
FIG. 5 is a flowchart showing one example of a printing process routine.
Figure 6:
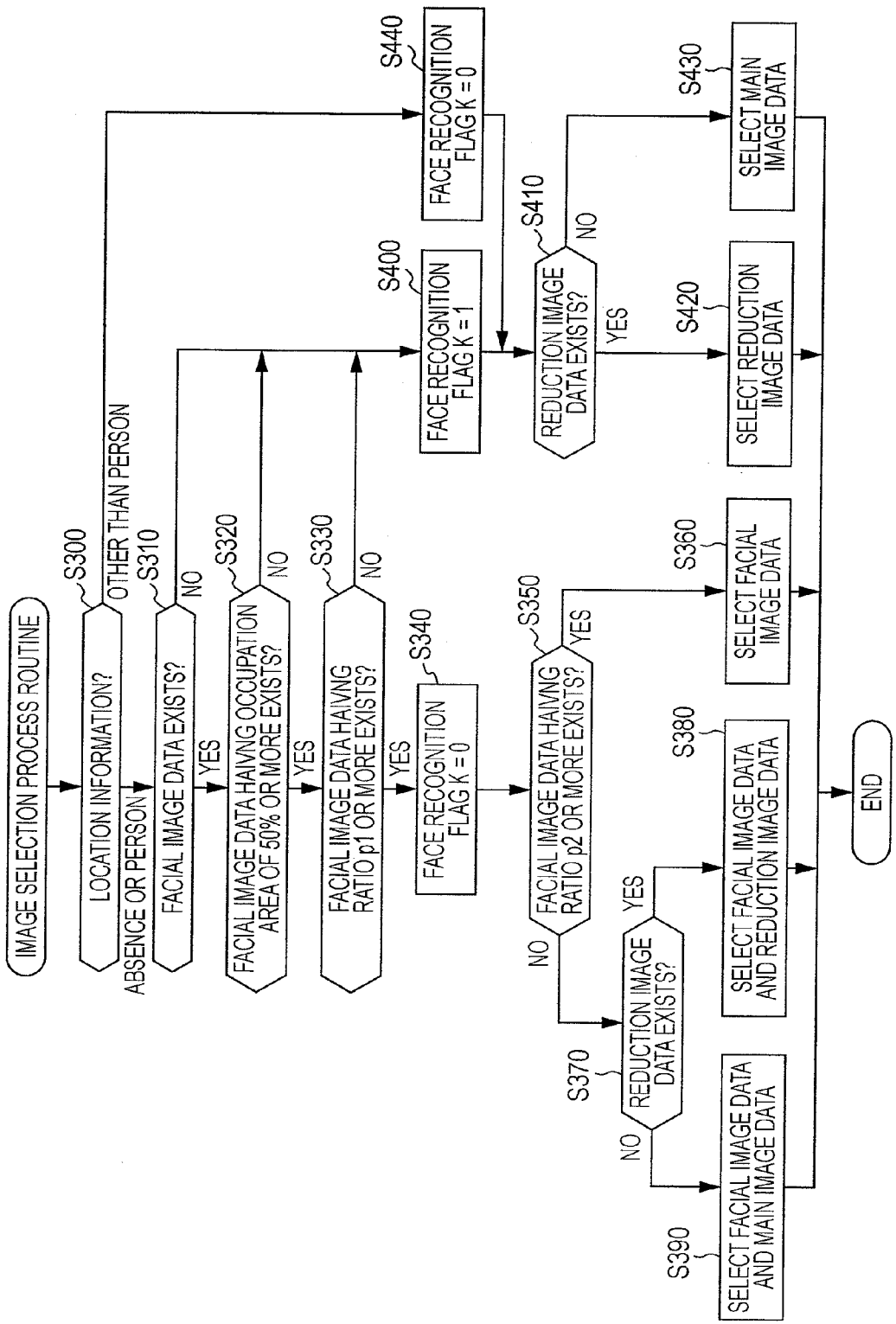
FIG. 6 is a flowchart showing one example of an image selection process routine.

First, the printing process will be described. FIG. 5 is a flowchart showing one example of a printing process routine. The routine is performed when a user manipulates the manipulation unit 44 of the manipulation panel 40 to instruct printing of the main image data of the collection file stored in the memory card 32. If the printing process routine is performed, the CPU 60 first performs an image selection routine for setting an image of the image data stored in the collection file to be printed, which is used for setting a correction parameter, as selection image data (Step S100). FIG. 6 is a flowchart showing one example of the image selection routine.

If the image selection routine is performed in Step S100, the CPU 60 first checks the location information of the main image data of the collection file (Step S300). According to the process, the value of the image number G mapped to the image type flag F having a value of 0 is checked from the individual management information of the collection file, and the location information of the mark segment APP1 of a data section corresponding to the value of the image number G is checked. For example, in the case of the collection file as shown in FIG. 4, since the image number G having a value of 1 corresponds to the image type flag F (=0) of the individual management information, it is understood that the first image data is the main image data, so that the location information of the first data section is checked. Herein, the location information, for example, indicates a main object of an image such as a person, a landscape or a night view, and is attached to image data when the image is photographed by a digital camera. In the case in which the location information indicates a person or the location information is not stored, the CPU 60 determines whether facial image data is included in the collection file (Step S310). This step is performed by checking whether the individual management information with the image type flag F having a value of 1 exists in the collection file. For example, in the case of the collection file as shown in FIG. 4, since the image type flag F having a value of 1 exists in the individual management information with the image number G having values of 2 and 3, positive determination is made.

Figure 7:
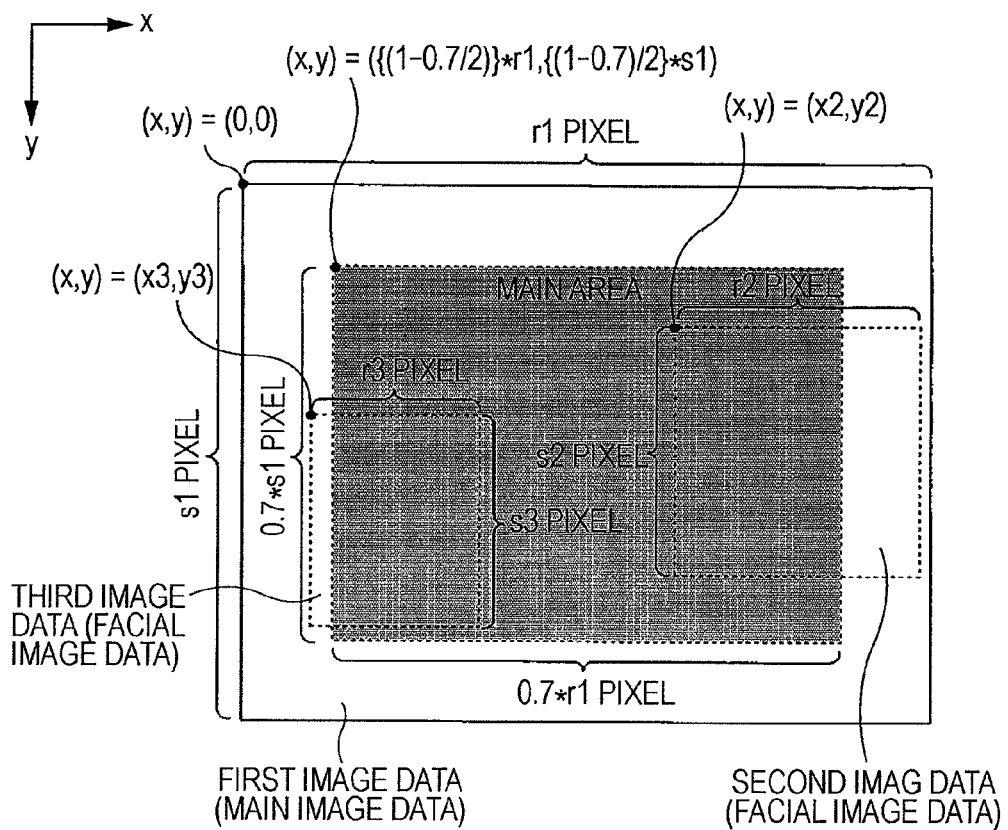
FIG. 7 is a view showing a relationship between first to third image data and a main area.

If the positive determination is made in Step S310, the CPU 60 determines whether facial image data having an occupation ratio of 50% or more is included in the main area of the main image data (Step S320). In the main image data, the main area has longitudinal and transversal lengths corresponding to 70% of the main image data, and has a center point the same as that of the main image data. As an example thereof, FIG. 7 is a view showing a relationship between the first to the third image data and the main area in the collection file as shown in FIG. 4. As shown in FIG. 7, the left upper coordinate of the main area is expressed by Equation 1 below using the image size (r1, s1) of the main image data, and the main area has a size of (0.7×r1 pixel in row)×(0.7×s1 pixel in column). Further, in relation to an area occupied by the second image data (facial image data) in the main image data, the left upper coordinate of the area is expressed by the position information (x2, y2), and the area has a size of (r2 pixel in row)×(s2 pixel in column). In relation to an area occupied by the third image data (facial image data) in the main image data, the left upper coordinate of the area is expressed by position information (x3, y3), and the area has a size of (r3 pixel in row)×(s3 pixel in column). As described above, the main area and the occupation area of the second and the third facial image data can be expressed using the position information (x, y) and the image size (r, s) stored in the individual management information. Thus, it is possible to determine easily whether 50% or more of the area of the facial image data is included in the main area through calculation. For example, in the case of the position relationship as shown in FIG. 7, 50% or more of the area of the second image data and 50% or more of the area the third image data are included in the main area, so that positive determination is made in Step S320.

$$(x, y) = (\{(1-0.7)/2\} * r1), (\{(1-0.7)/2\} * s1) \quad (1)$$

If the positive determination is made in Step S320, the CPU 60 determines the absence or existence of facial image data having a size, which is equal to or larger than a ratio p1 with respect to the size of the main image data, by using the value of the image size (r, s) of the facial image data for which the positive determination has been made in Step S320 (Step S330). Herein, the fact that the ratio of the size of the facial image data with respect to the size of the main image data is equal to or larger than the ratio p1 indicates that the number of row pixels is equal to or larger than (the number of row pixels of the main image data×the ratio p1), and the number of column pixels is equal to or larger than (the number of column pixels of the main image data×the ratio p1). According to the embodiment, the ratio p1 has a value of 0.3. For example, in the case of the collection file as shown in FIG. 4, since the positive determination has been made for the second and the third image data in Step S320, the CPU 60 determines the absence or existence of facial image data having a size of (0.3×r1 pixels in row) or more×(0.3×s1 pixels in column) or more by using the image size (r, s)=(r2, s2) of the second image data and the image size (r, s)=(r3, s3) of the third image data.

If the positive determination is made in Step S330, a face recognition flag K is set to 0 (Step S340). The face recognition flag K, which will be described in detail later, indicates whether it is necessary to perform face recognition before a correction parameter is set. When it is not necessary to perform the face recognition, the face recognition flag K is set to 0. In contrast, when it is necessary to perform the face recognition, the face recognition flag K is set to 1. When the positive determination has been made in Step S330, since facial image data having a predetermined size is stored in the collection file and the facial image data is set as selection image data used for setting a correction parameter in the subsequent process, the face recognition flag K is set to 0 in Step S340 because it is unnecessary to perform the face recognition. Thereafter, the CPU 60 determines the absence or existence of facial image data having a size equal to or larger than a ratio p2 with respect to the size of the main image data by using the value of the image size (r, s) of the facial image data for which the positive determination has been made in Step S330 (Step S350). Step S350 is identical to Step S330, except that the determination is performed using the ratio p2 instead of the ratio p1 and the determination is performed with respect only to the facial image data for which the positive determination has been made in Step S330. That is, according to the embodiment, the ratio p2 has a value of 0.4.

If the positive determination is made in Step S350, after the facial image data for which the positive determination has been made is set as the selection image data (Step S360), the routine ends. That is, when the positive determination has been made in Step S350, since the facial image data has a sufficient size, it is determined that the main image data is an image which employs the face of a person of the facial image data as a subject. Further, the facial image data is set as the selection image data such that the correction parameter is set based on the facial image data in a process which will be described later. Herein, the setting of the selection image data is performed by storing the value of the image number G of the image data in the RAM 80 as the image number of the selection image data. For example, in the case in which the facial image data for which the positive determination has been made in Step S350 is only the second image data as shown in FIG. 4, the value of 2 is stored in the RAM 80 as the image number of the selection image data. Plural pieces of selection image data may be provided. In such a case, plural image numbers are stored in the RAM 80. That is, in the case of the setting of the selection image data which will be described later, since image data set in the selection image data is different but the value of the image number G is stored in the RAM 80 similarly to the above case, detailed description thereof will be omitted.

Meanwhile, if negative determination is made in Step S350, it is determined that reduction image data exists in the collection file (Step S370). This step is performed by checking whether individual management information with the image type flag F having a value of 2 exists in the collection file. Further, when the positive determination has been made in Step S370, after the facial image data for which the positive determination has been made in Step S330 and the reduction image data are set as the selection image data (Step S380), the routine ends. That is, since the facial image data, for which the positive determination has been made in Step S330, has a predetermined size, the main image data is determined as an image that employs the face of the person of the facial image data and image data (e.g., a background landscape or the like), other than the face of the person, as a subject. Further, the facial image data and the reduction image data are set as the selection image data such that the correction parameter is set based on the facial image data and the reduction image data in a process which will be described later. Meanwhile, if negative determination is made in Step S370, after the facial image data for which the positive determination has been made in Step S330 and the main image data are set as the selection image data (Step S390), the routine ends. That is, Step S390 is identical to Step S380 because the main image data is determined as an image that employs the face of the person of the facial image data, for which the positive determination has been made in Step S330, and image data, other than the face of the person, as a subject. However, since the reduction image data does not exist, the facial image data and the main image data are set as the selection image data.

If negative determination is made in any one of Steps S310 to S330, the face recognition flag K is set to 1 (Step S400). Herein, since the negative determination is made in Steps S310 to S330 when there is no facial image data, the facial image data does not exist in the main area or the facial image data does not have a predetermined size or more, it is possible to determine that the facial image data cannot be used for setting the correction parameter. However, since positive determination is made in Steps S300, it is probable that the main image is the image which employs a person as a subject. In this regard, it is determined that it is necessary to perform the face recognition before the correction parameter is set, and the face recognition flag K is set to 1. Then, it is determined whether the reduction image data exists in the collection file (Step S410). If positive determination is made in Steps S410, after the reduction image data is set as the selection image data (Step S420), the routine ends. In contrast, if negative determination is made in Steps S410, after the main image data is set as the selection image data (Step S430), the routine ends. That is, the process of Step S410 is identical to the process of Step S370 as described above.

If location information other than a person is stored in Step S300, the face recognition flag K is set to 0 (Step S440), and the routine goes to Step S410 so that the above-described process is performed. When the location information other than the person is stored, since the main image data is not an image employing a person as a subject and thus it is determined that the face recognition is not necessary, the face recognition flag K is set to 0. Further, in the case in which the main image data is not the image employing the person as the subject, since the facial image data is not required to be used for setting the correction parameter, one of the reduction image data and the main image data is set as the selection image data through the processes after Step S410.

Hereinafter, the printing process routine will be described. If the above-described image selection process routine ends, the CPU 60 samples a plurality of pixels from the selection image data (Step S110). This step is performed by decoding image data, which matches with the image number of the selection image data stored in the RAM 80, by using the JPEG method to generate RGB data in pixel unit according to the above-described image selection process routine, and sampling the pixels from the RGB data. For example, when the image number stored in the RAM 80 has a value of 2, the second image data is decoded such that the pixels are sampled. That is, when plural pieces of the selection image data is provided, sampling is performed for each selection image data.

Next, it is determined whether the face recognition flag K has a value of 0 (Step S120). If positive determination is made in Step S120, a feature amount is extracted from sampling data obtained by sampling the pixels in Step S110 (in Step S130). In detail, an RGB histogram or a brightness histogram is obtained from the sampling data, and the feature amount of each image quality parameter such as brightness, chroma, color balance, contrast and sharpness is extracted. In the case in which plural pieces of the selection image data is provided, the feature amount is extracted for each selection image data. Then, a correction parameter is set such that the extracted feature amount approaches the feature amount of an image quality parameter of an image having a superior image quality (Step S140). That is, the feature amount of a desirable parameter is stored in advance in the flash ROM 70. Further, in the case in which plural pieces of the selection image data is provided, correction parameters are first of all derived for each selection image data, and an average value thereof is set as a correction parameter. Thereafter, the main image data corrected based on the set correction parameter is printed (Step S150), and the routine ends. In detail, the CPU 60 sequentially decodes the main image data to generate RGB data, creates after-correcting RGB data obtained by correcting the RGB data based on the correction parameter, and controls the printing device 20 to print the after-correcting RGB data. Consequently, the printing device 20 prints the after-correcting main image data by ejecting ink to the record sheet S from the printing head based on the after-correcting RGB data created by the CPU 60.

In contrast, if negative determination is made in Step S120, the face recognition process is performed with respect to the sampling data obtained through the sampling in Step S110 (Step S160). The face recognition process is performed by extracting a collection area of a flesh colored image, which has a predetermined number or more of components with a color near a flesh color, from the sampling data as a face candidate area having a rectangular shape, and determining the face candidate area as a face area when eyes can be detected from the extracted face candidate area. Herein, the determination regarding the existence of the flesh color is made by deciding in advance the range of RGB values of the flesh color on an RGB color space, and checking whether RGB values of each pixel exist in the range of the RGB values of the flesh color which is decided in advance. The eye detection is performed by determining an area of the extracted face candidate area, in which two sub-areas having a lower brightness value are located in parallel to each other, as the face area. Next, it is determined whether one or more face area is extracted through the face recognition process (Step S170). If positive determination is made in Step S170, the feature amount is extracted from the extracted face area (Step S180) and the correction parameter is set (Step S190). In the processes of Step S180 and Step S190, since the same processes as those of Step S130 and Step S140 are performed with respect to the face area extracted in Step S160, detailed description thereof will be omitted. That is, when plural face areas have been extracted in Step S160, the feature amount is extracted for each face area, preliminary correction parameters are derived, and an average value of the preliminary correction parameters is set as a correction parameter similarly to Step S130 and Step S140. Last, after the above-described process of Step S150 is performed, the routine ends. Consequently, the main image data corrected based on the correction parameter set in Step S190 is printed.

Further, if negative determination is made in Step S170, the routine goes to Step S130 so that the processes of Steps S130 to S150 are performed. That is, since the face area does not exist in the selection image data, the correction parameter is set from the sampling data obtained through the sampling in Step S110, and the after-correcting main image data is printed.

Figure 8:
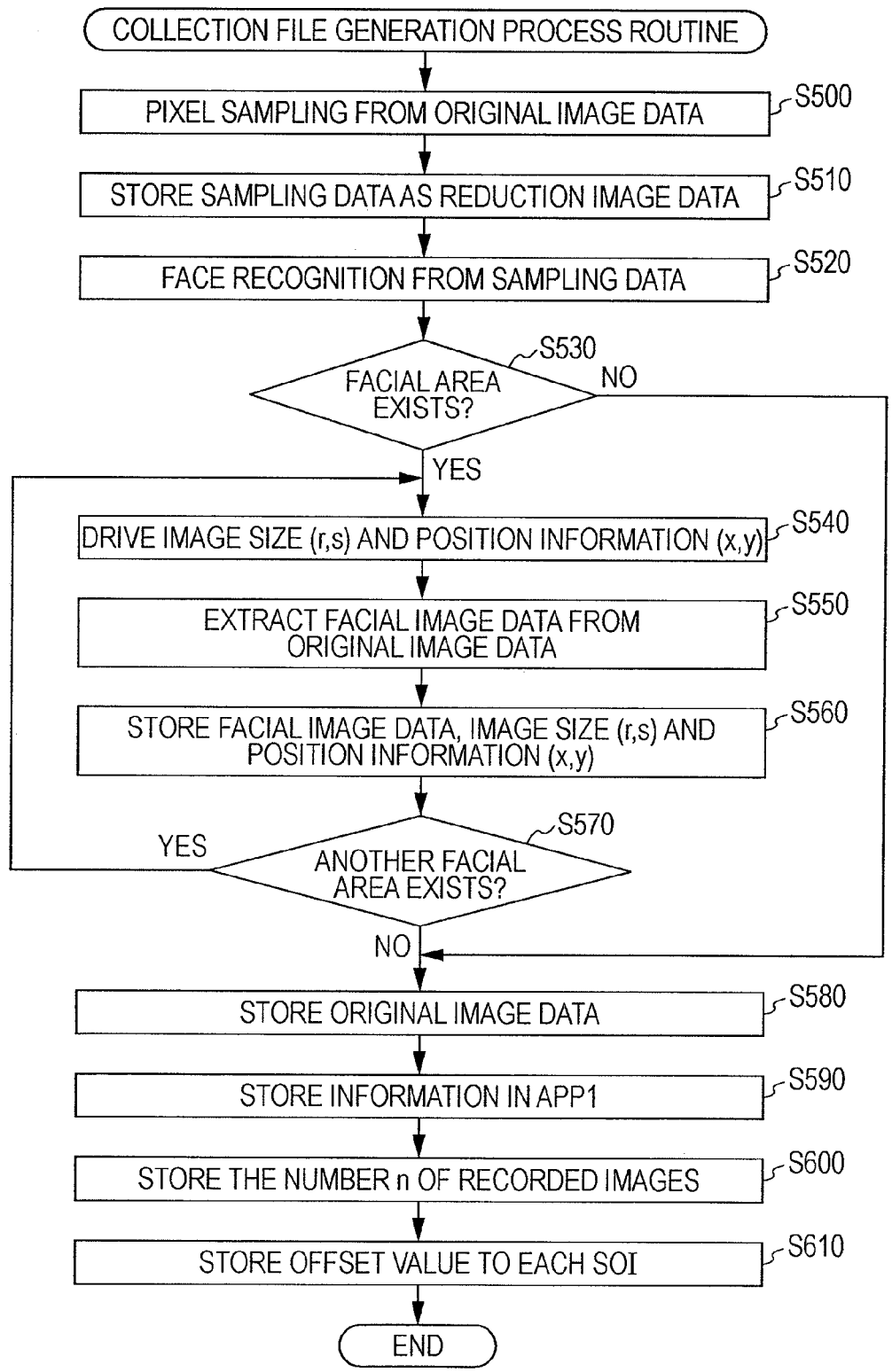
FIG. 8 is a flowchart showing one example of a collection file generation process routine.

Hereinafter, the collection file generation process, which generates the collection file by employing the image data stored in the memory card 32 as the main image data, will be described. FIG. 8 is a flowchart showing one example of a collection file generation process routine. This routine is performed when a user manipulates the manipulation unit 44 of the manipulation panel 40 to designate image data encoded using the JPEG method and stored in the memory card 32, and to instruct generation of the collection file which employs the designated image data (hereinafter, referred to as an original image data) as main image data. If the collection file generation process routine is performed, the CPU 60 first samples a plurality of pixels from the original image data (Step S500). According to this process, similarly to Step S110 of the above-described printing process routine, the original image data is decoded using the JPEG method to sample the pixels. Next, the CPU 60 stores the sampling data in the memory card 32 as the reduction image data of the collection file (Step S510). In detail, the CPU 60 derives an image size (r, s) of the sampling data (i.e., the reduction image data), generates after-encoding reduction image data by encoding the reduction image data using the JPEG method, and outputs the after-encoding reduction image data, the image size (r, s) and the image type flag F having a value of 2 to the memory card controller 34. Then, the memory card controller 34 ensures an area capable of preserving the collection file in the memory card 32, stores the reduction image data input from the CPU 60 as the second image data of the second data section, and stores the image type flag F having a value of 2 and the image size (r, s), which are input from the CPU 60, as the individual management information of the mark segment APP2 of the first data section after mapping the image type flag F having a value of 2 and the image size (r, s) to the image number G having a value of 2.

Thereafter, the face recognition process is performed with respect to the sampling data obtained through the sampling in Step S500 (Step S520). Since this process is identical to that of Step S160 of the above-described printing process routine, detailed description thereof will be omitted. Next, it is determined whether one or more face area is extracted through the face recognition process (Step S530). If positive determination is made in Step S530, in relation to the extracted one face area, the image size (r, s) and position information (x, y) are derived from the original image data of the face area (Step S540). Through the face recognition process in Step S520, since the image size and position information of the face area can be derived from the sampling data (i.e., the reduction image data), the image size (r, s) and position information (x, y) of the face area can be derived from the original image data by using the ratio of the size of the reduction image data with respect to the size of the original image data. That is, according to the process which will be described later, since the face area is extracted from the original image data on an MCU (Minimum Coded Unit) basis while maintaining data encoded using the JPEG method, it is necessary to determine values of the image size (r, s) and position information (x, y) such that the values become the number of pixels of one side of the MCU, that is, a multiple of a value of 8 (including a value of 0). Thus, the values simply derived using the ratio of the size of the reduction image data with respect to the size of the original image data is corrected such that the value properly becomes the multiple of 8, so that the values are derived as the values of the image size (r, s) and position information (x, y).

Then, the area expressed by the image size (r, s) and position information (x, y) derived in Step S540 is extracted from the original image data as the facial image data (Step S550). According to this process, the facial image data is extracted from the original image data on the MCU basis while maintaining encoded data. In such a case, since a difference value between a DC coefficient of each MCU and a DC coefficient of an adjacent MCU has been encoded, after the DC coefficient is decoded by the extracted MCU one time for recalculation, and then the result is encoded again. Thereafter, the facial image data extracted in Step S550, and the image size (r, s) and position information (x, y) derived in Step S540 are stored in the memory card 32 (Step S560). In detail, the CPU 60 outputs the facial image data, the image size (r, s), the position information (x, y) and the image type flag F having a value of 1 to the memory card controller 34. Then, the memory card controller 34 stores the facial image data input from the CPU 60 as the third image data of the third data section of the collection file, and stores the image type flag F having a value of 1, the image size (r, s) and the position information (x, y), which are input from the CPU 60, as the individual management information of the mark segment APP2 of the first data section after mapping the image type flag F having a value of 1, the image size (r, s) and the position information (x, y) to the image number G having a value of 3.

Thereafter, it is determined whether the face area derived in Step S520 exists besides the face area for which the process Step S560 has been performed (Step S570). The processes of Steps S540 to S570 are repeated until negative determination is made. Thus, the process, in which the facial image data is extracted from the original image data and stored in the memory card 32, is performed with respect to all face areas derived in Step S520. That is, when plural pieces of facial image data is input from the CPU 60, the memory card controller 34 sequentially stores the facial image data in data sections next to the third data section of the collection file, and increments the image number G, which is mapped to the image type flag F having a value of 1, the image size (r, s) and the position information (x, y) as the individual management information, by a value of 1 starting from a value of 3.

When it is determined that no one face area is extracted in Step S530 or the negative determination is made in Step S570, the original image data is stored in the collection file as the main image data (Step S580). In detail, the CPU 60 derives the image size (r, s) of the original image data and outputs the original image data, the image size (r, s) and the image type flag F having a value of 0 to the memory card controller 34. Then, the memory card controller 34 stores the original image data input from the CPU 60 as the first image data of the first data section of the collection file, and stores the image type flag F having a value of 0 and the image size (r, s), which are input from the CPU 60, as the individual management information of the mark segment APP2 of the first data section after mapping the image type flag F having a value of 0 and the image size (r, s) to the image number G having a value of 1. Thereafter, if Exif additional information of the original image data exists, the Exif additional information is stored in the APP1 of each data section (Step S590). Next, after the total number of the image data stored in the collection file is stored in the APP2 of the first data section as the number n of recorded images (Step S600), offset values to the SOI of each data section are derived and then stored as offset values to the SOI, which correspond to each image number G of the individual management information (Step S610), and the routine ends.

According to the collection file generation process routine as described above, after the reduction image data and the facial image data are generated from the original image data designated by a user, the reduction image data and the facial image data are matched with the original image data to conform to the format of the collection file, and then are stored in the memory card 32. Since the collection file is generated in the format as described in FIG. 3, the main image data (the original image data) can be corrected and printed through the above-described printing process routine.

Herein, the correspondence relationship between the elements of the embodiment and the elements of the invention is clarified. The CPU 60 of the embodiment corresponds to a selecting unit, a correction parameter setting unit, a correction processing unit, an obtaining unit and an auxiliary data generation unit, and the memory controller 34 corresponds to a collection data generation unit.

According to the embodiment as described above, in relation to the printing process, if the facial image data is stored in the collection file, the facial image data can be set as the selection image data and the correction parameter can be set from the facial image data. Thus, the correction parameter can be set in a short time as compared with the case of setting the correction parameter from the main image data. Further, if the reduction image data is stored in the collection file, the reduction image data can be selected as the selection image data and the correction parameter can be set from the reduction image data although the facial image data is not stored therein. Consequently, the correction parameter can be set in a short time as compared with the case of setting the correction parameter from the main image data.

Further, according to the printing process, since the facial image data having an occupation ratio of 50% or more in the main area is set as the selection image data, the correction parameter is set from the facial image data including the face of a person which is not a subject in the main image data, so that the correction can be prevented from being inaccurately performed with respect to the entire main image data.

Further, according to the printing process, since the facial image data having a size equal to or larger than the ratio p1 with respect to the size of the main image data is set as the selection image data, the correction parameter is set from the facial image data including the face of a person which is not the subject in the main image data, so that the correction can be prevented from being inaccurately performed with respect to the entire main image data.

Further, according to the printing process, when there exists the facial image data having a size equal to or larger than the ratio p2 with respect to the size of the main image data, only the facial image data is set as the selection image data. When there exists the facial image data having a size which is equal to or larger than the ratio p1 and less than the ratio p2, after it is determined whether the reduction image data exists, the facial image data and the reduction image data are set as the selection image data if the reduction image data exists. Thus, the case in which the main image data employs only the face of a person as a subject is distinguished from the case in which the main image data employs other objects as a subject as well as the face of a person, so that the correction parameter can be more properly set for each case.

Furthermore, according to the printing process, when the location information other than a person is stored, after it is determined whether the reduction image data exists without determining whether the facial image data is stored, the reduction image data is set as the selection image data if the reduction image data exists. Thus, the correction parameter is set from the facial image data even if the main image data is not an image which employs the face of a person as a subject, so that the correction can be prevented from being inaccurately performed with respect to the entire main image data.

Further, according to the collection file generation process, the reduction image data of the original image data, the facial image data obtained by extracting the face of a person from the original image data, and the image size (r, s) and position information (x, y) of the facial image data are created to generate the collection file combined with the original image data. Thus, when the original image data of the collection file is to be corrected and printed, the correction parameter can be set from the reduction image data and the facial image data, so that the setting of the correction parameter can be performed in a short time as compared with the case of setting the correction parameter from the entire original image data.

Further, since the facial image data is mapped to the image size (r, s) and position information (x, y) in the individual management information, whether to set the correction parameter from the facial image data can be determined using the image size (r, s) and position information (x, y).

In addition, the invention is not limited to the embodiment as described above, and it can be noted that various modifications can be made within the technical scope of the invention.

For example, according to the above-described embodiment, one reduction image data is stored in the correction file. However, plural pieces of reduction image data having a different image size (r, s) may be stored in the correction file. In such a case, the reduction image data selected in Step S420 of the image selection process routine may be selected from the plural pieces of reduction image data. For example, the reduction image data having the image size (r, s), which most nearly approaches a predetermined value, may be selected, and the reduction image data having the smallest image number G may be selected.

Differently from the above-described embodiment, after Step S320 of the image selection process routine is omitted, if the positive determination is made in Step S310, the routine may go to Step S330. Further, after Step S330 and Step S350 are omitted, if the positive determination is made in Step S320, the routine may go to Step S340 and then go to Step S360. In addition, after Step S320 and Step S350 are omitted, if the positive determination is made in Step S310, the routine may go to Step S330. If the positive determination is made in Step S330, the routine may go to Step S340 and then go to Step S360. Moreover, after the process of Step S300 is omitted, if the image selection process routine is performed, the process of Step S310 may be first performed. In such a case, after the processes of Steps S320, S330 and S350 are omitted, if the positive determination is made in Step S310, the routine may go to Step S340 and then go to Step S360.

According to the above-described embodiment, in Step S330 of the image selection process routine, the determination regarding whether there exists the facial image data having the size equal to or larger than the ratio p1 with respect to the size of the main image data is made. However, the determination may be made based on whether the image size (r, s) of the facial image data has a predetermined value or more, or the determination may be made based on whether data amount of the facial image data has a predetermined value or more. Step S350 is performed similarly to the above-described embodiment.

According to the above-described embodiment, when plural pieces of selection image data exists, preliminary correction parameters are derived for each selection image data, and an average value thereof is set as a correction parameter in Step S140. However, other values other than the average value may be used. For example, when the facial image data and the reduction image data are set as the selection image data, the preliminary correction parameter set from the facial image data is weighted by a predetermined value (e.g., two times or the like), so that an average value may be obtained. Further, when the facial image data and the reduction image data are set as the selection image data, only a part of the pixels of the main image data, which is included in the range of RGB values of a flesh color on the RGB color space, may be corrected using the preliminary correction parameter set from the facial image data, and remaining pixels may be corrected using the preliminary correction parameter set from the reduction image data.

According to the above-described embodiment, in relation to Step S320, the main area has longitudinal and transversal lengths corresponding to 70% of the main image data, and has the center point the same as that of the main image data. However, a different value other than 70% may also be employed. Further, an area, which does not have the center point the same as that of the main image data, may be employed. For example, a left upper area of the main image data may be employed, or an area of a center upper portion of the main image data may be employed.

According to the above-described embodiment, in Step S320, it is determined whether there exists the facial image data having an occupation ratio of 50% or more in the main area. However, a different value other than 50% may also be employed.

According to the above-described embodiment, when the facial image data is stored in the collection file, the facial image data, the image size (r, s) and the position information (x, y) are stored therein. However, instead of the image size (r, s) and the position information (x, y), other information, which indicates an area occupied by the facial image data in the main image data, may be stored therein. For example, coordinates of two top vertexes on a diagonal line of the facial image data in the main image data may be stored therein.

According to the above-described embodiment, when the facial image data is stored in the collection file, the facial image data, the image size (r, s) and the position information (x, y) are stored therein. However, only the facial image data may be stored therein. In such a case, Step S320 of the image selection process routine may be omitted, and, in Steps S330 and S350, the determination may be made using the size of the facial image data instead of the value of the image size (r, s).

According to the above-described embodiment, when the facial image data is stored in the collection file, the facial image data, the image size (r, s) and the position information (x, y) are stored therein. However, only the image size (r, s) and the position information (x, y) may be stored therein. In such a case, when the negative determination is made in Step S310, it is determined whether the image size (r, s) and the position information (x, y) are stored. Herein, if positive determination is made, an area expressed by the image size (r, s) and the position information (x, y) may be extracted from the main image data as partial image data similarly to Step S550. Further, after the extracted partial image data is regarded as the facial image data, the same process as that performed when the positive determination has been made in Step S310 may be performed. According to this configuration, although the facial image data is not stored in the collection file, if the image size (r, s) and the position information (x, y) exist, the same process as that performed when the facial image data is stored can be performed.

According to the above-described embodiment, in the collection file generation process routine, the collection file is generated, which stores the original image data and the image size (r, s) thereof, the reduction image data and the image size (r, s) thereof, the facial image data and the image size (r, s) thereof and the position information (x, y). However, the image size (r, s) and the position information (x, y) may not be stored, and the reduction image data and the image size (r, s) thereof may not be stored. Further, the facial image data may not be stored, and only the image size (r, s) and the position information (x, y) of the facial image data may be stored.

According to the above-described embodiment, in the collection file generation process, the collection file is generated by employing the image data, which is stored in the memory card 32 after being encoded using the JPEG method, as the main image data. However, the collection file may be generated from image data, other than the image data, stored in the memory card 32, or the collection file may be generated from image data which has not been encoded using the JPEG method. For example, the collection file may be generated by employing the RGB image data, which has been read by the reading device 22, as the main image data. Further, the collection file may be generated by employing image data, which has been received from a digital camera and a computer through infrared ray communication and a computer network, as the main image data.

According to the above-described embodiment, in the collection file generation process routine, the collection file is generated, which stores the original image data as the first image data, the reduction image data as the second image data, and the facial image data as image data next to the third image data. However, the original image data, the reduction image data and the facial image data may be stored in a random sequence. For example, after the facial image data may be first stored as the first image data, the reduction image data and the original image data may be stored.

According to the above-described embodiment, the image data is encoded and decoded using the JPEG method. However, encoding and decoding may be performed using another method.

What is claimed is:

1. An image processing apparatus for performing a correction process with respect to object image data, the image processing apparatus comprising:
a first determining unit that determines whether facial image data including a face of a person, which is extracted from the object image data, is attached to the object image data;
a second determining unit that determines whether reduction image data of the object image data is attached to the object image data;
a selecting unit that selects the facial image data or the reduction image data as selection image data;
a correction parameter setting unit that extracts a feature amount from the selection image data and sets a correction parameter for image correction based on the feature amount; and
a correction processing unit that corrects the object image data based on the correction parameter,
wherein the selecting unit selects the facial image data as the selection image data when the first determining unit determines that the facial image data is attached to the object image data, and
the selecting unit selects the reduction image data as the selection image data when the first determining unit determines that the facial image data is not attached to the object image data and the second determining unit determines that the reduction image data is attached to the object image data.

2. The image processing apparatus according to claim 1, wherein, when the facial image data is attached to the object image data, the selecting unit determines whether a ratio of a size of the facial image data with respect to a size of the object image data is equal to or larger than a predetermined first ratio, and selects the facial image data as the selection image data only when the ratio is equal to or larger than the first ratio.

3. The image processing apparatus according to claim 2, wherein the selecting unit determines whether the ratio of the size of the facial image data with respect to the size of the object image data is equal to or larger than a predetermined second ratio greater than the first ratio when facial image data of the first ratio or more is attached to the object image data, selects only the facial image data as the selection image data when the ratio is equal to or larger than the second ratio, determines whether the reduction image data of the object image data is attached to the object image data when the ratio is not equal to or larger than the second ratio, and selects the facial image data of the first ratio or more and the reduction image data as the selection image data when the reduction image data of the object image data is attached to the object image data.

4. The image processing apparatus according to claim 1, wherein the selecting unit determines whether area information, which indicates an area occupied by the facial image data in the object image data, is attached to the facial image data when the facial image data is attached to the object image data, determines whether an area of a predetermined ratio or more specified by the area information is included in a predetermined main area serving as a main area in the object image data when the area information is attached to the facial image data, and selects the facial image data as the selection image data only when the area of the predetermined ratio or more is included in the predetermined main area.

5. The image processing apparatus according to claim 1, wherein the selecting unit determines whether additional information, which indicates that the object image data is not an image employing a person as a subject, is attached to the object image data, determines whether the reduction image data of the object image data is attached to the object image data, without determining whether the facial image data is attached to the object image data, when the additional information is attached to the object image data, and selects the reduction image data as the selection image data when the additional information is attached to the object image data.

6. The image processing apparatus according to claim 1, wherein, when the facial image data is not attached to the object image data, the selecting unit determines whether area information, which indicates an area occupied by a face of a person in the object image data, is attached to the object image data, and, when the facial image data is attached to the object image data, the selecting unit extracts an area specified by the area information from the object image data as partial image data, and regards the partial image data as the facial image data to determine that the facial image data is attached to the object image data.

7. An image processing method for performing a correction process with respect to object image data, the image processing method comprising:
    a first determining step of determining whether facial image data including a face of a person, which is extracted from the object image data, is attached to the object image data;
    a second determining step of determining whether reduction image data of the object image data is attached to the object image data;
    selecting the facial image data or the reduction image data as selection image data;
    extracting a feature amount from the selection image data and setting a correction parameter for image correction based on the feature amount; and
    correcting the object image data based on the correction parameter,
    wherein selecting the selection image data comprises:
        selecting the facial image data as the selection image data when the first determining step determines that the facial image data is attached to the object image data, and
        selecting the reduction image data as the selection image data when the first determining step determines that the facial image data is not attached to the object image data and the second determining step determines that the reduction image data is attached to the object image data.

8. The image processing method according to claim 7, wherein, when the facial image data is attached to the object image data, the selecting the selection image data further comprises determining whether a ratio of a size of the facial image data with respect to a size of the object image data is equal to or larger than a predetermined first ratio, and selecting the facial image data as the selection image data only when the ratio is equal to or larger than the first ratio.

9. The image processing method according to claim 8, wherein the selecting the selection image data further comprises determining whether the ratio of the size of the facial image data with respect to the size of the object image data is equal to or larger than a predetermined second ratio greater than the first ratio when facial image data of the first ratio or more is attached to the object image data, selecting only the facial image data as the selection image data when the ratio is equal to or larger than the second ratio, determining whether the reduction image data of the object image data is attached to the object image data when the ratio is not equal to or larger than the second ratio, and selecting the facial image data of the first ratio or more and the reduction image data as the selection image data when the reduction image data of the object image data is attached to the object image data.

10. The image processing method according to claim 7, wherein the selecting the selection image data further comprises determining whether area information, which indicates an area occupied by the facial image data in the object image data, is attached to the facial image data when the facial image data is attached to the object image data, determining whether an area of a predetermined ratio or more specified by the area information is included in a predetermined main area serving as a main area in the object image data when the area information is attached to the facial image data, and selecting the facial image data as the selection image data only when the area of the predetermined ratio or more is included in the predetermined main area.

11. The image processing method according to claim 7, wherein the selecting the selection image data further comprises determining whether additional information, which indicates that the object image data is not an image employing a person as a subject, is attached to the object image data, determining whether the reduction image data of the object image data is attached to the object image data, without determining whether the facial image data is attached to the object image data, when the additional information is attached to the object image data, and selecting the reduction image data as the selection image data when the additional information is attached to the object image data.

12. The image processing method according to claim 7, wherein, when the facial image data is not attached to the object image data, the selecting the selection image data further comprises determining whether area information, which indicates an area occupied by a face of a person in the object image data, is attached to the object image data, and, when the facial image data is attached to the object image data, the selecting the selection image data further comprises extracting an area specified by the area information from the object image data as partial image data, and regarding the partial image data as the facial image data to determine that the facial image data is attached to the object image data.

* * * * *